Sept. 23, 1941.  A. B. JOHNSON ET AL  2,256,616
MEANS FOR SUPPORTING DECOYS
Filed April 14, 1941  2 Sheets-Sheet 1
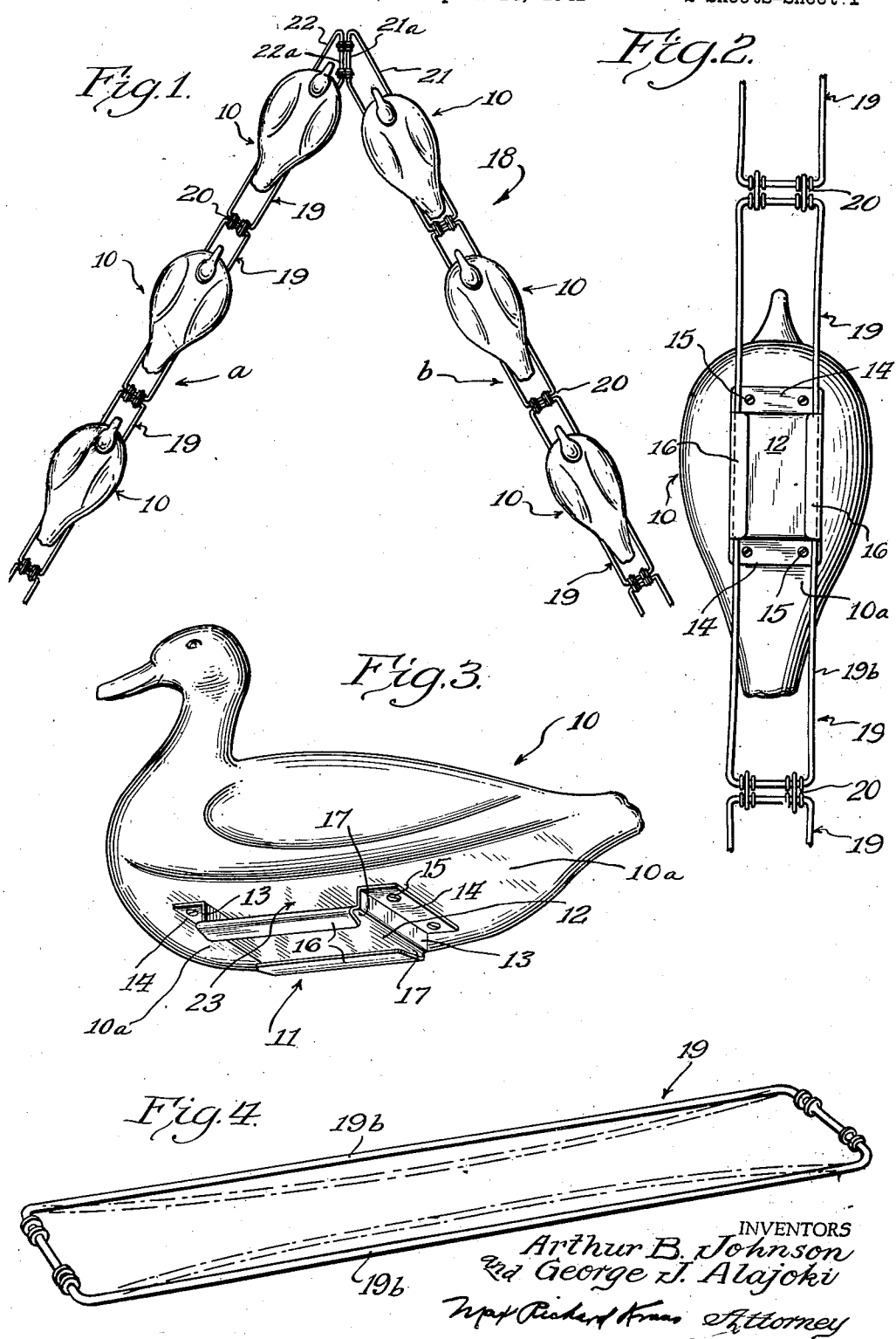
INVENTORS
Arthur B. Johnson
and George J. Alajoki

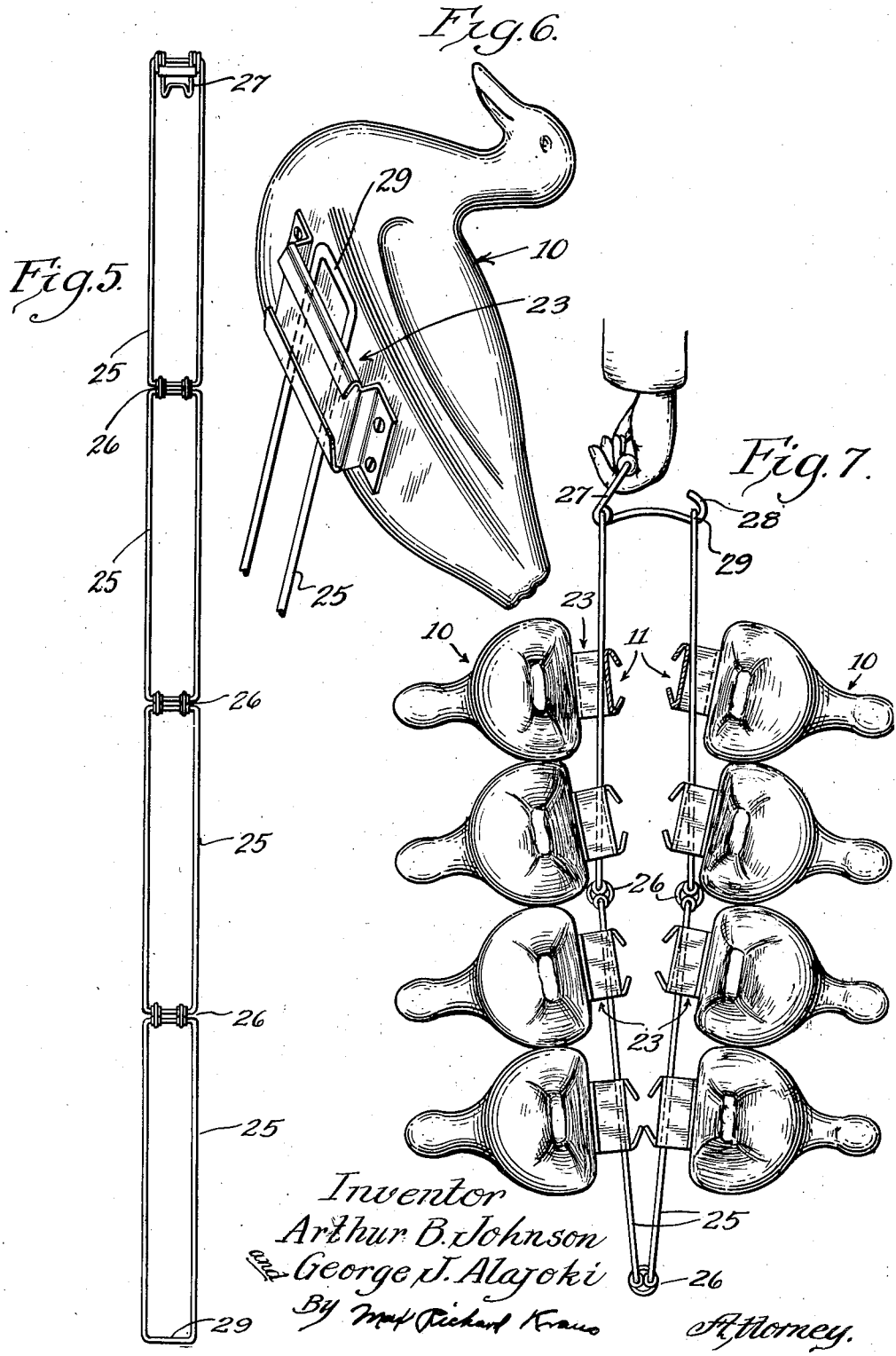

Patented Sept. 23, 1941

2,256,616

UNITED STATES PATENT OFFICE 2,256,616

MEANS FOR SUPPORTING DECOYS

Arthur B. Johnson and George J. Alajoki, Melrose Park, Ill.

Application April 14, 1941, Serial No. 388,480

10 Claims. (Cl. 43—3)

This invention relates to floating decoys and more particularly to the means for supporting same. One of the objects is to provide a structure which readily supports decoys in spaced relation to each other and in proper decoy formation.

Another object is to provide a structure which can be collapsed or folded up to consume a minimum of space.

Another object is to provide a structure by which the decoy can be readily and quickly secured and fastened to a supporting member and can be quickly and easily removed therefrom in a minimum of time and with minimum effort.

Another object is to provide a fastening member on the underside of a decoy which will permit same to be readily secured to a supporting frame for supporting same in water in decoy formation and will also permit the decoy to be secured to a frame member for transport or storage.

Another object is to provide a structure which is simple and economical to manufacture and easy to operate.

Other objects will become apparent as this description progresses.

Referring to the drawings

Fig. 1 is a plan view of a plurality of decoys mounted or supported in accordance with our invention.

Fig. 2 is a bottom plan view showing the manner of securing and fastening the decoy to the supporting frame member.

Fig. 3 is a perspective view of a decoy with our fastening member mounted on the underside thereof.

Fig. 4 is an enlarged perspective view of one of the supporting frame sections and also showing in dotted lines the position assumed by it just prior to inserting same in the fastening member.

Fig. 5 is a plan view of a decoy carrying member.

Fig. 6 is a view showing the manner of inserting the decoy on the carrying member and Fig. 7 is an end elevational view partly in cross section showing the decoys supported on the carrying member.

As will be seen Figs. 1 to 4 inclusive show the means for supporting the decoys in the water, while Figs. 5 to 7 inclusive show the manner of supporting said decoys in carrying position.

Since all of the decoys 10 have identical fastening members only one will be described in detail. The fastening member indicated generally at 11 and preferably formed of a non-corrosive material has a bottom 12, upwardly extending end walls 13 and lateral extensions 14 which extensions are provided with openings through which pass suitable fastening members 15 which secure the fastening member to the bottom or underside 10a of the decoy. Extending from the bottom 12 are downwardly formed longitudinal flanges 16 which are inclined at an angle to form wedging spaces 17 within which fit as though wedged the sides of the supporting frame presently to be described.

In the main the supporting frame generally indicated at 18 is formed of a plurality of rectangularly shaped sections 19 formed of wire or some such material which has a certain resiliency to permit same to be compressed slightly along its longitudinal axis. The sections 19 are hingedly secured together by suitable links 20 which permit the folding or collapsing of the sections upon each other in either direction. The front adjoining sections 21 and 22 of the supporting frame are substantially like the remaining sections 19 except that the ends 21a and 22a of the frame sections instead of being at right angles to the sides are at an oblique angle thereto so that when the sections are placed adjacent each other and hinged by links 20, the sections will have two wings a and b forming a V formation as shown in Fig. 1.

The supporting frame sections 19 of each wing a and b can be folded or collapsed flat upon each other and the two front adjoining sections 21 and 22 folded on each other so that the size of the entire supporting frame in its folded position is the length of one section. This permits same to be readily transported and stored.

In order to mount the decoys on the supporting frame the sides 19b of the sections are compressed inwardly as shown in dotted lines in Fig. 4 so that the sides clear the edges of the flanges 16 and can be inserted in the wedging spaces 17 and when released the sides will tend to spring back to their partially normal position shown in Fig. 2. However the sides will not return to their full normal position but will remain partially compressed in the fastening member, thus more firmly wedging the sides of the frame in the wedging recesses and holding the decoy against sliding movement thereon.

It is preferable that the locking be effected as shown in the drawings, midway between the ends of each section.

It will be seen that the bottom 12 of the fastening member 11 is spaced from the underside of the decoy to provide a pocket 23 which will permit the decoys to be readily carried as shown more particularly in Figs. 6 and 7. Spacing of the bottom in this manner permits the supporting frame section to be readily grasped without interference or contact with the bottom of the decoy and also same will keep the frame submerged in the water.

One decoy can be mounted on each section as shown in Fig. 1 or they can be mounted on alternate sections if desired. A suitable anchoring rope not shown can be attached to front portion of the device.

The particular construction of this invention enables the decoys to be readily secured together so that same can be easily and conveniently carried. Figs. 5 to 7 inclusive show the manner of so doing.

The rectangular wire frames 25 are hingedly secured together by suitable links 26. One of the wire frames has a pivotally mounted handle 27 which has a locking member 28 which locks with the end 29 of the opposite end frame. The decoys are slid sidewise on the frame as shown in Fig. 6 so that the frame will pass through the pocket 23 of the fastening member 11. When the frame sections are folded or brought together as shown in Fig. 7 the decoys will be mounted on each side with the decoys facing outwardly. The ends are then locked by the locking member 28 and the decoys can be bodily carried by means of the handle.

It is to be understood that the form of our invention, herewith shown and described, is to be taken as a preferred example of the same, and that various changes in the shape, size and arrangement of parts may be resorted to, without departing from the spirit of our invention or the scope of the appended claims.

We claim:

1. In a decoy device comprising a supporting frame formed of a plurality of rectangularly shaped wire sections having compressible sides, and a fastening member on the underside of each decoy, said decoy being secured to said supporting frame by compressing said sides to permit locking engagement with said supporting frame.

2. In a decoy device comprising a V shaped supporting member formed of a plurality of hinged sections, and a fastening member having flange means fixed on the underside of each decoy for detachably mounting said decoy directly on said supporting member, said supporting member being collapsible by folding said sections upon each other when said decoys are detached from said member.

3. In a decoy device comprising a fastening member on the underside of each decoy, and a supporting member formed of a plurality of rectangularly shaped wire sections hingedly secured to each other and foldable upon each other, the front adjoining sections of said supporting member being angularly disposed and hingedly secured to each other.

4. In a decoy device comprising a fastening member on the underside of each decoy, and a supporting member formed of a plurality of rectangularly shaped wire sections hingedly secured to each other and foldable upon each other, said supporting member adapted to be secured to said fastening member to spacedly support said decoys.

5. In a device for supporting a plurality of decoys comprising a fastening member on the underside of the decoy, said fastening member having flanged portions, and a supporting member adapted to be readily locked in engagement with said flanged portions by first compressing said supporting member, said supporting member being readily releasable from said flanged portions by compressing same.

6. In a device for supporting a plurality of decoys comprising a fastening member mounted on the underside of each said decoy, said fastening member having flange means, and a supporting member adapted to be readily locked in engagement with the flange means of said fastening member and readily releasable therefrom, said member having sections which are folded upon each other when removed from said fastening member.

7. In a device for supporting a plurality of decoys comprising a fastening member positioned at the underside of each said decoy, said fastening member having flange means, and a supporting member adapted to be locked in engagement with the flange means of said fastening member, said supporting member being readily releasable from said fastening member and being collapsible when removed from said fastening member.

8. In a device for supporting a plurality of floating decoys comprising a fastening member having flange means positioned at the bottom of each said decoy and means adapted to be locked in engagement with the flange means of said fastening member for spacedly supporting said decoys from each other, said means comprising a plurality of sections which are collapsible when removed from said fastening member.

9. In a decoy device comprising a fastening member on the underside of each decoy, and a plurality of rectangularly shaped wire sections hingedly secured to each other, said fastening member securing said decoys to said wire sections.

10. In a decoy device comprising a fastening member on the underside of each decoy, said fastening member having a pocket, and a supporting member formed of a plurality of rectangularly shaped wire sections hingedly secured to each other, said supporting member passing through said pocket for securing said decoy to said supporting member.

ARTHUR B. JOHNSON
GEORGE J. ALAJOKI.